(No Model.)
H. MYERS.
WHEEL TIRE.
No. 468,971. Patented Feb. 16, 1892.
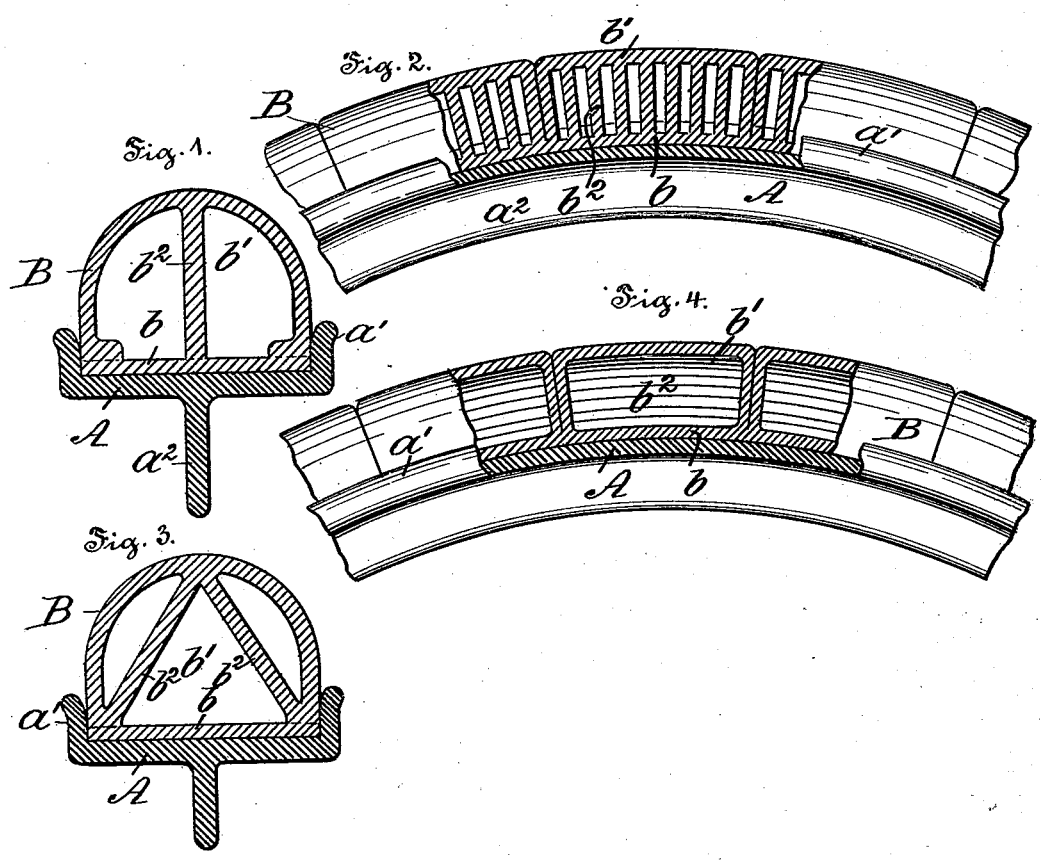
Witnesses
Hermann Bornemann
M. E. Myers.
Inventor:
Henry Myers.

UNITED STATES PATENT OFFICE.

HENRY MYERS, OF PHILADELPHIA, PENNSYLVANIA.

WHEEL-TIRE.

SPECIFICATION forming part of Letters Patent No. 468,971, dated February 16, 1892.

Application filed October 3, 1891. Serial No. 407,662. (No model.)

*To all whom it may concern:*

Be it known that I, HENRY MYERS, a citizen of the United States, residing at Philadelphia, in the county of Philadelphia and State of Pennsylvania, have invented certain new and useful Improvements in Wheel-Tires, of which the following is a specification.

My invention relates to wheel-tires employed in cycles and other vehicles, and more particularly to the class known as "inflatable" tires; and this invention is an improvement on the wheel-tire covered by Letters Patent No. 456,705, granted to me on July 28, 1891.

The disadvantages experienced in the use of the inflated tire heretofore known are, first, that when the inflated tubing or hollow tire is cut by sharp points or stones on the roadway the vehicle is rendered entirely useless, as the inflating agent of the tire escapes through such cuts, which causes the collapse of the hollow tire; second, the cock on the nozzle provided for the admission of the inflating agent may easily be opened by accident or otherwise, which will have the same result—the collapse of the tire. To overcome these objections I provide a metal or other tire of any preferable cross-section with a hollow tire made in sections composed of rubber or other analogous elastic material, so that when any one or more sections are cut and destroyed the remaining sections will uphold the desired effect of retaining a perfect, flexible, and easy-running tire.

Another object is to prevent any slipping of the wheel-tire on slippery or other roadways, which is entirely obviated by my sectional tire, as each section thereof will substantially form a flexible tooth engaging with and grabbing into the cavities of the roadway.

The object of my present invention is to provide each section with one or more divided or undivided elastic webs or walls, bearing, respectively, against the back and thread portion of each section, and which webs or walls are formed either integral with or cast to each section in order to give each of them more resiliency and a greater cushioning effect to its thread portion.

My invention will be more fully understood taken in connection with the accompanying drawings, in which—

Figure 1 is a cross-section of an elastic hollow wheel-tire composed of an endless band having bulbs provided with an elastic center wall attached thereto. Fig. 2 is a view, partly in section, of a portion of a tire, showing the elastic hollow sections, as illustrated in Fig. 1, with broken or perforated walls. Fig. 3 is a cross-section of an elastic hollow wheel-tire composed of an endless band having bulbs provided with two converging walls or webs attached thereto. Fig. 4 is a view showing a portion of the tire illustrated in Fig. 3, partly in section.

Referring now to the drawings for a further description of my invention, and more particularly to Figs. 1 and 2, A is the metal tire of any cross-section; but preference is given to that shown in the drawings, having two flanges $a'$ for retaining the elastic band $b$ and its bulbs $b'$ and a flange $a^2$ for the securing of the spokes.

B is the hollow elastic tire composed of the endless band $b$, to which are attached hollow bulbs of any preferable cross-section. These bulbs are of such a length that when the tire is on a roadway two or more will contact with the same, so that if one of the sections is mutilated the adjacent sections will uphold the desired effect of retaining an easy running elastic tire, and, moreover, these sections will adapt themselves easier to uneven road-beds and will grab into the cavities of the same, preventing any slipping or other retrograde motion.

Each section or bulb is, as shown in Fig. 1, provided with a solid center wall or web $b^2$, dividing the hollow bulb into two compartments for the purpose of reducing the cross area of the air-space, and, furthermore, to give an additional elastic support to the thread portion of the tire. This wall or web may, however, be perforated, as shown in Fig. 2, to produce a highly elastic and efficient support to the thread portion.

Figs. 3 and 4 show a modified form of tire B. The bulbs $b'$ are divided by two converging walls or webs $b^2$ into three compartments and are secured to the endless band $b$ by cement or other adhesive substance. If desired, these walls or webs may also be perforated and pillars be formed to support the thread portion of the tire from the back portion lying against the metal tire A.

It is obvious that modifications may be made without departing from the spirit of my invention.

Having thus described the nature and object of my invention, what I claim as new, and desire to secure by Letters Patent, is—

1. An elastic wheel-tire composed of sections having one or more elastic perforated or slotted walls adapted to form a highly-elastic support and bearing against the thread and back portion of said sections composing the tire, substantially as and for the purposes set forth.

2. An elastic wheel-tire composed of an endless band having bulbs attached thereto, each bulb provided with one or more elastic supports bearing against the thread portion of said tire, substantially as and for the purposes set forth.

In witness whereof I have hereunto set my signature in the presence of two subscribing witnesses.

HENRY MYERS.

Witnesses:
JOSEPH H. RABER,
W. P. SHIBER.